3,595,919
PROCESS OF MANUFACTURING N,N'-POLYTHIO-BIS-DIALKYLAMINE
Kyung S. Shim, Dobbs Ferry, N.Y., assignor to Stauffer Chemical Company, New York, N.Y.
No Drawing. Filed July 23, 1968, Ser. No. 746,745
Int. Cl. C07c *85/00, 85/04*
U.S. Cl. 260—583      5 Claims

ABSTRACT OF THE DISCLOSURE

A two step process for manufacturing N,N'-polythio-bis-dialkylamine which consists of intermixing a dialkylamine with a water immiscible organic solvent and thereafter adding simultaneously an aqueous inorganic base and a sulfur chloride composition to form an intermediate product. The intermediate product is separated from an aqueous layer that is formed. Thereafter, elemental sulfur is added to the organic layer and reacted therewith to form an end product consisting of N,N'-polythio-bis-dialkylamine wherein said sulfur rank ranges between 5 and 8.

BACKGROUND OF THE INVENTION

Copolymers derived from α-olefins such as the poly-α-olefin copolymer ethylene/propylene rubber, have recently entered the market on a large commercial scale. Because of low monomer cost, this material promises to be the rubber industry's lowest price elastometer and because of the essentially free double bond content, this material is outstanding in its resistance to degradation by oxygen and ozone. For this reason, however, this rubber material is rather difficult to vulcanize. Moreover, a noxious odor is given off when the rubber material is finally cured which is objectionable.

In order to overcome this vulcanization problem, a synthetic rubber composition has been developed that is sulfur curable and based on ethylene and propylene. This product contains, besides ethylene and propylene, a third monomer unit derived from a non-conjugated diene. The resulting terpolymer, after polymerization, contains a controlled degree of unsaturation which, as in the case of butyl rubber, serve as curing sites for vulcanization with standard sulfur containing compositions. Although the odor problem is less critical by the use of this terpolymer, the curing rate is still sluggish.

To reduce the cure time of the ethylene/propylene diene terpolymer, curing agents or cross-linking agents have been proposed to vulcanize the rubber material at a reduced cure cycle. Thus, commercial manufacturers of the ethylene/propylene diene terpolymer recommend recipes based on curing agents such as tetramethyl thiuram disulfide, 2-mercaptobenzothiazole, tellurium diethyl dithiocarbamate and dipentamethylenethiuram tetrasulfide. However, the recipes formulated by the manufacturers have not been notably successful in reducing curing time of the terpolymer.

More recently, it has been proposed to use N,N'-polythio-bis-dialkylamine as the curing agent for the rubber composition. This curing agent has not been notably successful because of the lack of sulfur content therein.

In order to overcome the lack of sulfur content within this material, higher polysulfides of aliphatic and heterocyclic secondary amines have been prepared by a two step process. Thus, the appropriate amine is first reacted with free sulfur or sulfur monochloride to produce the intermediate polysulfide, e.g., the disulfide, trisulfide or tetrasulfide. The intermediate sulfide is isolated and then reacted with free sulfur by heating a mixture of the intermediate sulfide and a calculated amount of sulfur to a temperature above the melting point of sulfur, usually about 120 to 130° C. The molten mixture is usually maintained at this temperature for several hours, in order to insure completing the reaction. Then, the mixture is cooled and allowed to stand for several days to allow the unreactive sulfur to precipitate. The oily product is dark colored because of decomposition occurring during the prolonged heating.

It has been proposed to prepare the N,N'-polythio-bis-dialkylamine in a one step process by simultaneously adding a caustic solution in a solution of at least 1 gram atom of free sulfur in one mole of sulfur monochloride in an alkaline aqueous reaction medium containing one mole of a secondary amine from the group consisting of water soluble, saturated aliphatic and heterocyclic secondary amines. The reaction medium is maintained at a pH range of 8 to about 11.5 to produce the reaction product. It is then separated from the reaction medium. While this procedure does produce a higher sulfur containing composition, the yields provided are relatively low.

BRIEF DESCRIPTION OF THE INVENTION

A novel process has been discovered which forms N,N'-polythio-bis-dialkylamine in relatively high yields and comprises the steps of first intermixing a suitable dialkylamine with an immiscible organic solvent in a suitable reaction vessel. Then, a suitable sulfur chloride is simultaneously added with an aqueous inorganic base to maintain the reaction medium in a basic condition. The organic layer and aqueous layer are then separated. Thereafter, free elemental sulfur is added to the organic layer and allowed to react therewith to provide the resultant polythio-bis-dialkylamine. It is essential to the practice of the present invention that the inorganic base and sulfur chloride be simultaneously added therewith to provide yields in excess of 90%.

DETAILED DESCRIPTION OF THE INVENTION

In the practice of the present invention, a suitable dialkylamine is first selected to provide the requisite properties to the end product. Thus, the dialkylamine may be selected from the group consisting of dimethylamine, diethylamine, dipropylamine, dibutylamine, and mixtures thereof. As is apparent, the alkyl moiety can be selected from a group of alkyl groups having from 1 to about 8 carbon atoms. The dialkylamine is then intermixed with an organic solvent which is immiscible with water. The solvent selected should be relatively inert to the products added thereto and are preferably selected from the aliphatic and aromatic hydrocarbon series. Thus, the immiscible organic solvent can be selected from the group consisting of hexane, petroleum ethers, benzene, ether, chlorinated hydrocarbon, toluene, xylene, or mixtures thereof.

After the dialkylamine and immiscible organic solvent have been thoroughly intermixed together, a suitable aqueous inorganic base and sulfur chloride are simultaneously added thereto. The inorganic base and sulfur chlorides can be each added in a separate funnel or conduit or can be intermixed therewith. The aqueous inorganic base can be selected from the group consisting of sodium hydroxide, sodium carbonate, potassium hydroxide, potassium carbonate, and mixtures thereof. The sulfur chlorides can be selected from the group consisting of sulfur monochloride, sulfur dichloride, polymeric sulfur chlorides, and mixtures thereof. The amount of sulfur chloride and aqueous inorganic base employed is that necessary to react with all the dialkylamines or the stoichiometric amount. Preferably, however, about a ten percent excess of each component is employed.

The sulfur chlorides and inorganic base are reacted with the dialkylamine at a temperature ranging between room temperature up to about 60° C., preferably at around room temperature. The pH of the reaction medium is maintained above 7, preferably between 9 and 12. After the components have reacted together, the aqueous layer is separatted from the organic layer.

Free elemental sulfur is added to the organic layer in at least stoichiometric and excess quantity to provide an end product of bis-dialkylamine sulfide having a sulfur rank of at least 5, but preferably having an average sulfur rank of about 6.0 to about 8. The reaction temperature is maintained between about 50 and 150° C. The product is then separated from the solvent system. It has been found in practice that the use of this two phase system to synthesize the N,N'-polythio-bis-dialkylamine provides a yield of at least 90% and usually up to about 98 to 99%.

In order to illustrate the merits of the present invention, the following examples are provide:

Example I

A 1 liter 3 necked round bottle flask was equipped with a mechanical stirrer, thermometer, and two dropping funnels and placed in an ice bath. To it was added 225 grams of a 40% solution of dimethylamine and 30 milliliters of hexane and stirred vigorously. Then, 176 grams of a 50% solution of sodium hydroxide and 149 grams of sulfur monochloride was added dropwise by means of the two dropping funnels while stirring at medium speed. The rate of addition was controlled such that the reaction mixture remained at about 25° C. The rate of sodium hydroxide addition was slightly faster than sulfur monochloride addition in order to maintain the reaction medium in a basic condition. After the completion of the addition of sodium hydroxide and sulfur monochloride, the mixture was allowed to stir for an hour at room temperature. The hexane layer was separated from the aqueous layer and washed once with water. The solvent was removed by distillation at atmospheric pressure. The reaction vessel was then heated to 105° C., wherein elemental sulfur (140 grams) was added and the mixture heated to maintain the temperature at 105° C., for one half hour. Reduced pressure was applied to the reaction vessel for a period of about 5 minutes to remove any solvent which was dissolved in the mixture. The mixture was constantly heated for an additional two hours at atmospheric pressure to complete the reaction. The reaction was completed between 1.25 hours to two hours and then cooled to room temperature. The reaction product was treated with a small amount of sulfur which separated out the unreacted sulfur within a half hour period. The liquid product was readily decanted from the sulfur. The filtrate or decanted oil was obtained as a yellow oil and analyzed to provide a yield of 97% based on dimethylamine having a sulfur content of 70.5%.

Example II

The procedure as outlined in Example I was repeated in its entirety except the mole ratios of dimethylamine, sulfur monochloride and sodium hydroxide was 2:1.1:2.2. The product was obtained in 98% yield.

Example III

The procedure as outlined in Example II was repeated in its entirety, except the initial reaction between the dimethylamine sulfur monochloride and sodium hydroxide was maintained at 36° C. The product was obtained in 95% yield.

Example IV

The procedure of Example I was repeated in its entirety, except sulfur dichloride was used in lieu of sulfur monochloride. The results obtained paralleled those obtained in Example I.

What is claimed is:

1. A process of manufacturing N,N'-polythio-bis-dialkylamine comprising the steps of:
   (a) mixing a dialkylamine wherein the alkyl group has from 1 to about 8 carbon atoms, with a water immiscible organic solvent selected from the group consisting of hexane, petroleum ethers, benzene, ether, chlorinated hydrocarbon, toluene, xylene and mixtures thereof;
   (b) reacting an aqueous inorganic base composition selected from the group consisting of sodium hydroxide, sodium carbonate, potassium hydroxide, potassium carbonate, and mixtures thereof, and a sulfur chloride composition selected from the group consisting of monochloride, sulfur, dichloride, polymeric sulfur chlorides, and mixtures thereof, with said dialkylamine at a temperature ranging between room temperature and about 60° C. and wherein the pH of the reaction medium is maintained above 7, said inorganic base and sulfur compositions being added simultaneously in an amount up to about 10% in excess of that necessary for complete reaction with said dialkylamine;
   (c) separating the formed organic and aqueous layers; and
   (d) reacting at a temperature ranging between 50° and 150° C. an amount of elemental sulfur with said organic layer, sufficient to provide a product having a sulfur rank of at least 5.

2. The process as set forth in claim 1 wherein the pH of the reaction between the dialkylamine and inorganic base and sulfur chloride ranges between 9 and 12.

3. The process as set forth in claim 1 together with the additional step of separating the end product from the solvent.

4. The process as set forth in claim 1 wherein said dialkylamine is dimethylamine and said solvent is hexane, and said inorganic base is sodium hydroxide, and said sulfur chloride composition is sulfur monochloride.

5. The process as set forth in claim 1 wherein the amount of sulfur reacted with said organic layer is that necessary to provide a sulfur rank ranging between 5 and 8.

References Cited

UNITED STATES PATENTS

| | | | |
|---|---|---|---|
| 2,417,954 | 3/1947 | Sloan | 260—583EE |
| 2,766,236 | 10/1956 | Harman | 260—583EE |
| 2,779,761 | 1/1957 | Kibler | 260—583EE |
| 3,394,185 | 7/1968 | Clemens | 260—583EE |

CHARLES B. PARKER, Primary Examiner

R. L. RAYMOND, Assistant Examiner

U.S. Cl. X.R.

260—45.9